United States Patent [19]

Cheng

[11] Patent Number: 5,546,179
[45] Date of Patent: Aug. 13, 1996

[54] METHOD AND APPARATUS FOR MAPPING THE EDGE AND OTHER CHARACTERISTICS OF A WORKPIECE

[76] Inventor: David Cheng, 711 Hibernia Ct., Sunnyvale, Calif. 94087

[21] Appl. No.: 319,531

[22] Filed: Oct. 7, 1994

[51] Int. Cl.⁶ .................................................. G01B 11/24
[52] U.S. Cl. .......................... 356/73; 356/371; 356/375; 356/376; 250/559.22; 250/559.36; 250/559.29
[58] Field of Search ........................... 356/73, 371, 375, 356/376, 425; 250/559.22, 559.27, 559.29, 559.35, 559.36

[56] References Cited

U.S. PATENT DOCUMENTS

| | | | |
|---|---|---|---|
| 3,406,292 | 10/1968 | Geier et al. | 250/224 |
| 4,145,140 | 3/1979 | Fujii | 356/360 |
| 4,297,034 | 10/1981 | Ito et al. | 356/394 |
| 4,402,613 | 9/1983 | Daly et al. | 356/426 |
| 4,457,664 | 7/1984 | Judell et al. | 414/779 |
| 4,667,113 | 5/1987 | Nakajima et al. | 250/561 |
| 4,672,196 | 6/1987 | Canino | 250/225 |
| 4,815,857 | 3/1989 | Bragd | 356/372 |
| 4,819,167 | 4/1989 | Cheng et al. | 364/167.01 |
| 4,853,880 | 8/1989 | Akamatsu et al. | 364/559 |
| 4,900,940 | 2/1990 | Nakamura | 250/560 |
| 4,907,035 | 3/1990 | Galburt et al. | 356/150 |
| 5,125,791 | 6/1992 | Volovich | 414/786 |
| 5,134,303 | 7/1992 | Biech et al. | 250/560 |
| 5,159,202 | 10/1992 | Ametani | 250/561 |
| 5,162,642 | 11/1992 | Akamatsu et al. | 250/201.6 |
| 5,194,743 | 3/1993 | Aoyama et al. | 250/548 |
| 5,238,354 | 8/1993 | Volovich | 414/779 |
| 5,264,918 | 11/1993 | Kagami | 356/400 |
| 5,270,560 | 12/1993 | Cheng | 356/376 |
| 5,369,286 | 11/1994 | Cheng | 250/561 |

FOREIGN PATENT DOCUMENTS

| 5-206237 | 8/1993 | Japan | 356/376 |
|---|---|---|---|

*Primary Examiner*—F. L. Evans
*Attorney, Agent, or Firm*—Hickman Beyer & Weaver

[57] ABSTRACT

A method and apparatus for mapping the edge and other characteristics of a wafer. A method for mapping the edge of a wafer includes steps of providing a sensor device over a surface of a wafer on a testing chuck. A beam of electromagnetic energy emitted by the sensor device is reflected from the surface of the wafer and its intensity is measured by the sensor device. The sensor device is focussed and is then positioned at the edge of the wafer by measuring the intensity of the reflected beam as the sensor device is moved. A changed intensity signifies that the sensor device is located at the edge of the wafer. The wafer is incrementally rotated and the intensity of the reflected beam is measured at multiple locations on the edge of the wafer to provide datapoints used in the edge mapping. The height of the wafer is mapped by moving the sensor device in a z direction perpendicular to the surface of the wafer. A focal distance is found where the reflected beam is at a maximum intensity. Multiple focal distances taken from different locations on the wafer are compared to map the height of the wafer. The reflectivity of the wafer is also detected at the focal distance.

17 Claims, 9 Drawing Sheets

METHOD AND APPARATUS FOR MAPPING THE EDGE AND OTHER CHARACTERISTICS OF A WORKPIECE

BACKGROUND OF THE INVENTION

1. Field of the Invention

This invention relates to semiconductor manufacturing, and more particularly to mapping the edge and other characteristics of semiconductor wafers and other workpieces.

2. Background of the Related Art

Semiconductor wafers are handled in many types of test and manufacturing equipment. Characteristics of a wafer thus often need to be known to test the wafer. One characteristic is the orientation of a wafer, which is used to provide a standard reference against which the location and characteristics of test points may be measured. To provide an orientation and other information, wafers are manufactured with index marks such as flats or notches provided in the edge of the wafer. A testing apparatus or semiconductor manufacturing equipment can position the wafer at a chosen orientation or test a specific section of the wafer by referencing the index mark. In addition, there is often a need to know the location of the center of a wafer. For example, robot arms that handle wafers should be able to detect the center of a wafer so that the arm can reliably position the wafer on a testing platform. It is therefore desirable to have a mechanism for finding both the index mark and the center of a wafer for both testing and manufacturing purposes.

One way to find wafer index marks and centers is to map the edge of a wafer. This can be accomplished using a variety of methods. In one method, a wafer is positioned on a rotatable platform having a smaller diameter than the wafer, where the edge of the wafer is positioned within or over a sensor. The platform is rotated, and the position of the edge of the wafer is detected by the sensor throughout the entire 360-degree rotation. From this edge information, notches or flats in the wafer's edge can be found, and the center of the wafer can be calculated. Once the edge is mapped, a robot arm typically picks up the wafer and places the wafer on a different testing platform, such as a test chuck, in the desired orientation. Testing and processing apparatus can then perform tests and processing at specific points on the wafer.

Problems with this prior art method include the fact that the wafer must be transported from the edge mapping platform to a different test chuck for testing or processing. This introduces some possible error to the center location and orientation data of the wafer: the center point of the wafer on the chuck may not be precisely known due to positional shifts of the wafer when it was transported. Thus, the location of points on the wafer which are tested on the chuck may not be known accurately. In addition, testing and processing times for a semiconductor wafer are increased due to the prior art process of transporting the wafer from an edge mapping appratus to a testing/processing apparatus.

The prior art edge mapping apparatus also include limitations for the dimensions of the rotatable platform depending on the size of the wafer being tested. The wafer must be larger than the platform so that the wafer's edge is positioned within or near the sensor. This provides constraints on the size of the platform, and can be a problem if testing differently-sized wafers on the same platform. For example, an 8-inch wafer might be larger than a testing platform and thus could have its edge mapped, but a 6-inch wafer might not be large enough to use the same platform apparatus.

Another characteristic of a wafer which often needs to be known to test the wafer is the height of the wafer at various points on the wafer's surface, i.e. a height mapping of the wafer. Since a wafer is subject to various stresses during testing or transport, the surface of the wafer can often become warped. Testing equipment such as contact probes must be precisely positioned to contact a wafer's surface without damaging the wafer. If a wafer has a warped surface, the height of the wafer can vary over the surface of the wafer. A mapping of the wafer's height is thus useful in determining at what height above a wafer a probe or other test apparatus should be positioned.

Another problem with the prior art apparatus for mapping the edge of a wafer is that their mapping functions are quite specific to wafer edge mapping. If other characteristics of the wafer need to be mapped, such as height or reflectivity, a different testing apparatus must be used. This can lead to inefficiency in testing time when transporting the wafers and inefficiency in manufacturing cost of producing several different testing apparatus.

What is needed is an apparatus and method that will quickly, accurately and economically map the edge of a wafer on a testing chuck or other surface so that the wafer does not have to be transported to a separate testing or processing surface. What is also needed is such an edge mapping apparatus and method that also maps a variety of additional characteristics of the tested wafer or other workpiece.

SUMMARY OF INVENTION

The present invention addresses the problems in the prior art by providing a method and apparatus for in situ mapping of the edge of a wafer on a rotatable testing chuck using a sensor device. A wafer is positioned on the chuck and rotated so that the sensor device measures the position of the edge of the wafer as it rotates. The sensor device is provided only on a single side of the wafer, and thus allows the edge mapping to take place on the same chuck as the testing or processing of the wafer takes place. In addition, the sensor device maps such characteristics of the wafer as height and reflectivity. These improvements allow the edge and other characteristics of a wafer to be determined quickly, accurately, and economically.

A method of the present invention for mapping the edge of a wafer includes steps of positioning a wafer on a rotatable platform and providing a sensor device over the surface of the wafer. A beam of electromagnetic energy is emitted by the sensor device and is reflected from the surface of the wafer. The intensity of the reflected beam is measured by the sensor device. Relative movement is then provided between the sensor device and the wafer on an x-axis so that the sensor device is positioned at the edge of the wafer. To position the sensor device at the edge, the intensity of the reflected beam is measured during the relative movement between the sensor device and wafer. When the intensity changes, it indicates that the beam emitted by the sensor device is being reflected at the edge of the wafer. Finally, relative rotational movement is provided between the wafer and the sensor device and the intensity of the reflected beam is measured at multiple locations on the edge of the wafer as datapoints. The datapoints are used in mapping the edge of the wafer.

The platform is a rotatable chuck that preferably has a larger diameter than a diameter of said wafer. In the described embodiment, the sensor device is moved in the x-direction and the wafer is rotated. The method also preferably includes a step of focussing the sensor device by moving the sensor device in a z-direction perpendicular to the surface of the wafer. The sensor device is positioned at a z-distance where the reflected beam is near a maximum intensity. To position the sensor device at the edge, multiple intensity levels of the reflected beam are stored as the sensor device moves. A derivative of the intensity levels is preferably calculated to accurately determine the position of the edge of the wafer. Once the sensor device is at the edge and the wafer is rotated, the sensor device is moved in the x-y plane to maintain the sensor device at the edge of the wafer during the rotatation. This is accomplished by checking if the intensity of the reflected beam has changed after a portion of the rotation has occurred. Encoded information marked on the surface of the wafer can also be read in an additional step.

A method of the present invention for mapping the height of a wafer includes steps of positioning a wafer on a rotatable platform and providing a sensor device over the surface of the wafer. A beam of electromagnetic energy emitted by the sensor device is reflected from the surface of the wafer and its intensity is measured by the sensor device. Relative movement between the sensor device and the wafer is then provided in a z direction perpendicular to the surface of the wafer. The sensor device is focussed by positioning it at a first focal distance where the reflected beam has a maximum intensity. The step of providing relative movement in the z-direction is repeated at a different location on the wafer's surface to obtain a second focal distance. The first focal distance and the second focal distance are utilized in mapping the height of the wafer.

Relative movement between the wafer and the sensor device in the x-y plane is preferably provided to position the sensor device over the surface of the wafer. In the described embodiment, the sensor device is moved in the z-direction to find the maximum intensity. Preferably, multiple intensity levels are stored as the sensor device moves in the z-direction. A derivative is then calculated to accurately find the point of maximum intensity. Preferably, the sensor device is moved to a different position over the wafer when the second (and additional) focal points are measured. By comparing the multiple focal distances, the height variations in the wafer can be found and mapped. The method also can include a step of measuring the reflectivity of the surface of the wafer at each location using the measured maximum intensity of the reflected beam.

An apparatus of the present invention for determining characteristics of a workpiece includes a turntable which rotates a wafer around a center of rotation. A sensor device positioned on a single side of the wafer includes an emitter for emitting a beam of electromagnetic energy and a detector for detecting the intensity of the emitted beam after it has been reflected from the surface of the wafer. A mechanism is included for providing relative motion between the wafer and the sensor device. Characteristics of the wafer can be determined from the intensity of the reflected beam and the position of the sensor device relative to the wafer.

The turntable is a chuck generally having a greater diameter than the wafer. The mechanism for providing relative motion includes a mechanism for moving the sensor device along an x-axis parallel to the surface of the wafer. In addition, a mechanism is included for moving the sensor device in a z-direction perpendicular to the surface of the wafer. This mechanism includes a carriage coupled to the sensor device and a motor for moving the carriage. A controller, such as a digital computer, is preferably coupled to the sensor device and to the motor for controlling the apparatus.

The present invention has the advantage of being an in situ edge mapping apparatus. A wafer's edge can thus be mapped and the wafer oriented directly on a chuck which is also used for testing and/or processing the wafer. The wafer can be tested or processed immediately following the edge mapping without having to be transported to a separate testing surface. This allows the locations of points on the wafer to be more precisely known and tested. In addition, since a testing chuck typically has a larger diameter than the wafer, a variety of sizes of wafers can have their edges mapped on a single chuck.

The present invention also has the advantage of accurately mapping the edge of a wafer. By using the intensity of a reflected beam of energy, the apparatus can determine where the edge of the wafer is and can accurately determine the points along the edge. The use of derivatives and least squares line fits on stored intensity levels in the present invention adds to the accuracy of the wafer edge map.

The present invention also has the advantage of using a single apparatus for mapping the edge of a wafer, mapping the height of a wafer, and mapping the reflectivity of a wafer. Testing time and manufacturing costs can be reduced significantly using this apparatus.

These and other advantages of the present invention will become apparent to those skilled in the art after reading the following descriptions and studying the various figures of the drawings.

DETAILED DESCRIPTION OF THE PREFERRED EMBODIMENTS

Figure 1:
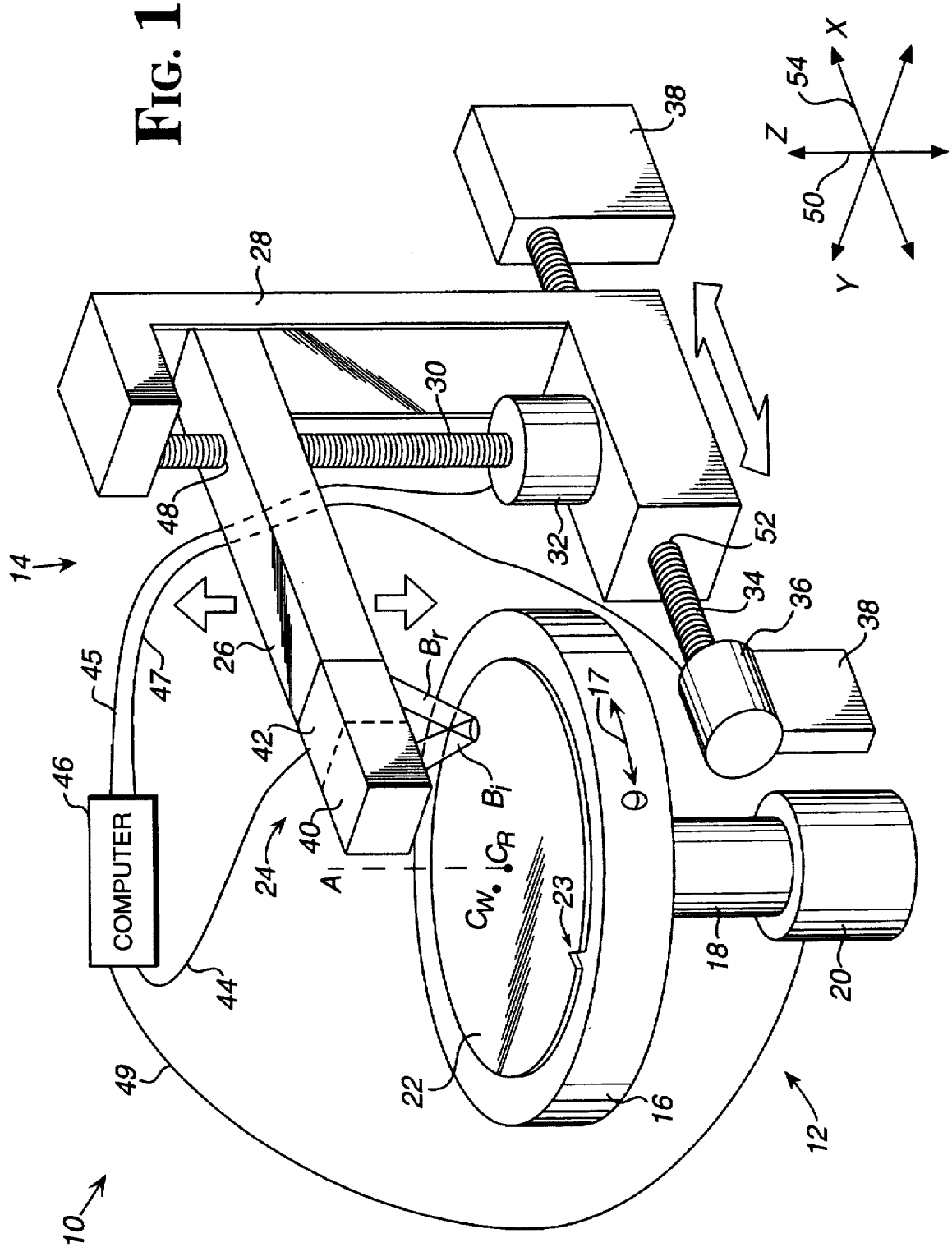
FIG. 1 is a perspective view of an apparatus for mapping the edge and other characteristics of a workpiece according to the present invention.

FIG. 1 is a perspective view of an apparatus 10 for mapping the edge and other characteristics of a wafer in accordance with the present invention. Apparatus 10 includes a chuck assembly 12 and a sensor assembly 14.

Chuck assembly 12 preferably includes a rotatable chuck 16 coupled to a support shaft 18. Support shaft 18 is coupled to a chuck motor 20. Chuck motor 20 is preferably a stepper motor which can rotate shaft 18 and chuck 16 in steps of a specific resolution. The chuck 16 and wafer 22 are rotated on the θ axis 17 about axis A. Chuck assembly 12 is adapted to support a wafer 22 or similar workpiece which will be tested to determine its characteristics. Chuck 16 is preferably a standard chuck which can be used for testing and processing wafer 22 by other apparatus after the edge has been mapped according to the present invention. In the preferred embodiment, chuck 16 extends beyond the edge of wafer 22, as shown in FIG. 1. Chuck 16 can thus be made large enough to accommodate a variety of sizes of wafers. In addition, in the described embodiment, the surface of chuck 16 is generally rough, non-specular, diffusing or darkly-colored relative to the surface of wafer 22, as is generally the case for chucks used in semiconductor processing and testing. The surface of chuck 16 thus has a much lower reflectivity than wafer 22.

Wafer 22 is typically from four to eight inches in diameter and is made from semiconductor grade silicon or equivalent material. Wafer 22 often can include an index mark 23 which is typically a triangular notch cut out of the edge of the wafer as shown in FIG. 1 or one or more flats provided in the edge of the wafer. Flats are straight edges on the edge of wafer 22 formed by cutting off a section of the wafer at the edge. Index marks provide a reference for points mapped out on the wafer surface.

The center of the wafer $C_W$ and the center of rotation $C_R$ of the wafer are also shown in FIG. 1. The center of rotation of the wafer is the center $C_R$ of the chuck 16. Due to inaccuracies in the placement of the wafer 22 on the chuck 16, the center $C_W$ may be offset from center $C_R$. When viewing a small portion of edge 25 from a stationary point as wafer 22 is rotated by chuck 16, the edge 25 of the wafer seems to move slightly closer or further from the center of rotation $C_R$ due to the off-center position of wafer 22.

Sensor assembly 14 is provided to one side of chuck assembly 12. Sensor assembly 14 includes a sensor device 24, an support arm 26, a vertical member 28, a vertical screw shaft 30, a z-direction motor 32, a horizontal screw shaft 34, an x-direction motor 36, and a support base 38.

Sensor device 24 of the described embodiment is coupled to a support arm 26 and includes an emitter 40 and a detector 42. Emitter 40 projects a beam Bi of electromagnetic energy, such as visible or infrared light, towards the surface of wafer 22 which is positioned on chuck 16. Emitter 40 can be a high-intensity light emitting diode, a laser, etc. The beam Bi incident on the surface of wafer 22 is reflected from the surface of the wafer and is directed back to detector 42 as beam Br. The detector is able to sense the intensity of the beam Br of light reflected back, and outputs a signal indicating the detected intensity on bus 44 to a digital computer 46. The detector is able to sense the intensity of the reflected beam Br by measuring the incident energy as a beam spot on a detection field. A sensor device suitable for use with the present invention is HEDS 1500 available from Hewlett-Packard of Palo Alto, Calif. This device includes both an emitter and a detector, as described above. This emitter/detector pair is a Universal Product Code (UPC) sensor which can be used to read bar coded information. Some wafers can be encoded with bar codes which can be read by such as device, as described with reference to FIG. 8.

Support arm 26 supports sensor device 24 above the surface of wafer 22. Support arm 26 includes a threaded bore 48 which is engaged with vertical screw shaft 30. When vertical screw shaft 30 is rotated about its central axis, support arm 26 and sensor device 24 move up or down along the z axis 50 depending on the direction of rotation. This movement along the z-axis is approximately perpendicular to the x-y plane of the surface of the wafer 22. Support arm 26 is also secured and guided by vertical member 28. Vertical screw shaft 30 is coupled to a shaft of z-direction motor 32 which is operative to rotate shaft 30. Z-direction motor 32 is preferably a stepper motor and is supported by vertical member 28, which also supports vertical screw shaft 30.

Vertical member 28 is a carriage that includes a threaded bore 52 which engages horizontal screw shaft 34. As horizontal screw shaft 34 is rotated about its central axis, vertical member 28 is moved in an x-y plane, for example, along the x-axis 54. Vertical member 28 is moved either closer to chuck 16 or further away from the chuck, depending on the direction of rotation of horizontal screw shaft 34. X-direction motor 36 is preferably a stepper motor that is coupled to horizontal screw shaft 34 and is operative to rotate the shaft 34. Support base 38 provides a base for sensor assembly 14.

In alternate embodiments, mechanisms other than those described above can be used to move sensor device in the z-direction and along a single axis of the x-y plane.

Digital computer 46 is a computational device used in the determination of the characteristics of wafer 22. Computer 46 receives a signal representing the intensity of reflected beam Br from detector 42 on bus 44. Computer 46 also sends output signals on bus 45 and bus 47 to activate stepper motor 32 and stepper motor 36, respectively. The computer can instruct the motors to rotate screw shafts 30 and 34 for a desired amount of steps or increments to move sensor device 24. Computer 46 is also coupled to chuck motor 20 by bus 49. Computer 46 can send output signals to chuck motor 20 to rotate chuck 16 in steps similar to those described with reference to motors 32 and 36. The computer can also display graphs, such as those shown in FIGS. 3b and 4b (described below) on a display device such as a monitor or display screen (not shown). A suitable computer which can be used as digital computer 46 is an IBM-PC AT class personal computer or equivalent.

In the described embodiment, the probe assembly 14 is moved in a z-direction and in an x-direction to map the edge and the height of the wafer on chuck 16 while chuck 16 and wafer 22 remain stationary along those z- and x-axes. Alternatively, chuck 16 and wafer 22 can be moved along the z-axis, the x-axis, or both, while sensor assembly 14 can remain stationary in either or both of those directions. Relative motion is desired in the present invention between the sensor device 40 and the wafer 22 in the θ-, z-, and x-directions.

A typical procedure for using apparatus 10 is as follows. Wafer 22 is positioned on chuck 16 using a human operator, a robot arm, or any other method typically used. Sensor device 24 is moved over the wafer 22 using motor 36 to a point where the beam emitted from emitter 40 will strike the surface of the wafer. Edge characteristics are then mapped using a procedure detailed in FIG. 2, where chuck 16 is rotated and sensor device 24 is moved in z- and x-directions. Other characteristics are then tested as desired. When all testing and/or processing is complete, vertical member 28 is moved in an x-direction away from the wafer until sensor device 24 is no longer above the wafer. Wafer 22 is then removed from chuck 16.

Figure 2:
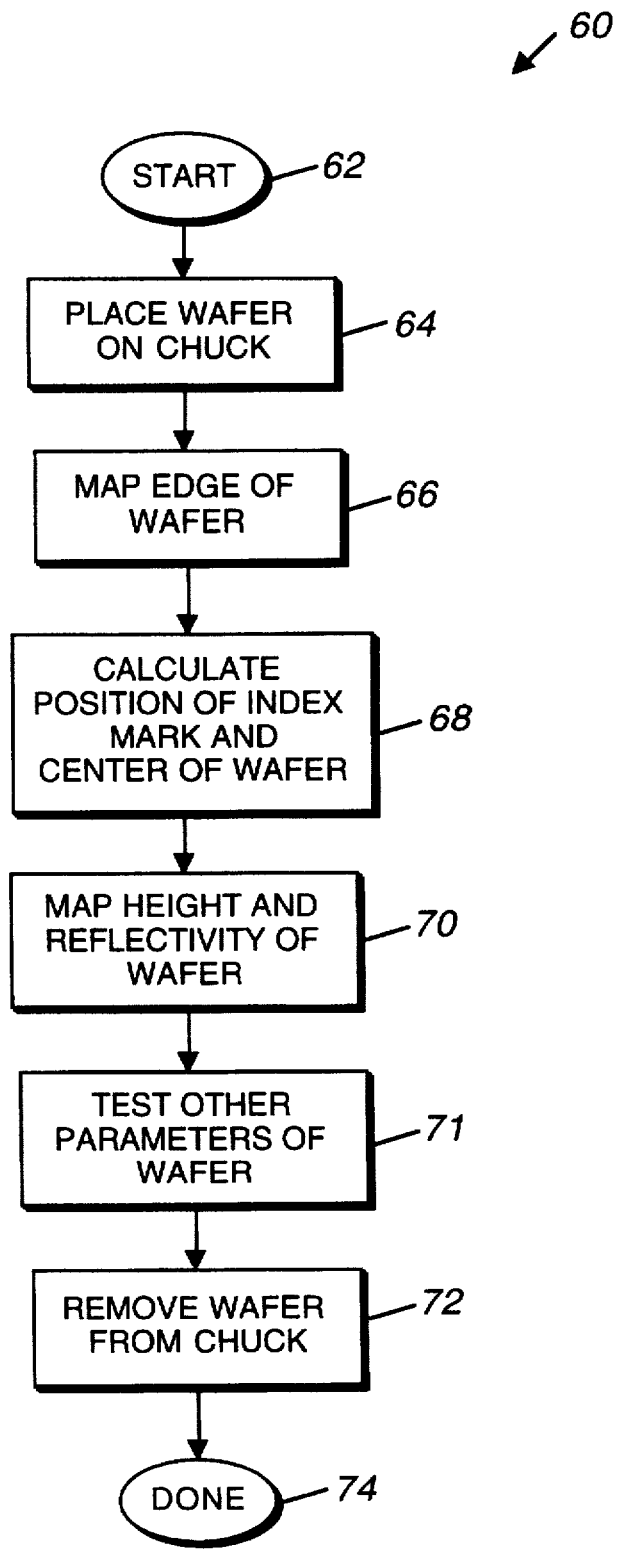
FIG. 2 is a flow diagram illustrating the method of the present invention for mapping the characteristics of a workpiece and testing the workpiece.

FIG. 2 is a flow diagram illustrating a method 60 of mapping the characteristics of a wafer. The characteristics mapped by the described process are the edge location, the height of the wafer, and the reflectivity of the wafer. The process begins at 62. In step 64, a wafer 22 is placed on chuck 16 as described with reference to FIG. 1. In step 66, the edge 25 of the wafer is mapped using the chuck assembly 12 and sensor assembly 14. This process is described in greater detail with respect to FIG. 3.

In step 68, the position of an index mark 23 on wafer 22 and the center of wafer 22 are calculated using the edge data measured in step 66. The process of calculating the position of the index mark can be accomplished according to several methods which are well known to those skilled in the art. For example, the mapped edge datapoints from step 66 provide the radius and angle for a number of points around the edge of wafer 22. A few of these points will have a noticably smaller radius, indicating that a flat or a notch was present at those points; the location of the flat or notch can thus be found. Similarly, the center of the wafer 22 can be calculated using the radius and angle data for the points collected in step 66. Since the edge mapped datapoints provide information on how the radius varies over the entire circumference of the wafer according to the present center of rotation of the wafer, the difference in location between the center of rotation and the center of the wafer can be calculated.

In step 70, the height and reflectivity of the wafer over one or more points on the surface of the wafer are mapped. This process is described in greater detail with respect to FIG. 7. The height of the wafer at various points can be quite useful if the wafer is to be probed with other apparatus, where a small difference in height of the wafer can cause differences in measurements. For example, if a four-point probe for measuring the resistivity of the wafer is to be brought in contact with the wafer, the exact height of the wafer needs to be known to move the four-point probe (or move the wafer) the proper vertical distance to provide this contact. The reflectivity of the wafer can be used to determine if the wafer has a clear surface or if a haze or other obscuring material is present on the wafer surface. A poor reflectivity can also indicate a rough or coarse wafer surface; these abnormal wafer surfaces can significantly influence the outcome of tests and processing.

In next step 71, other tests or processing of wafer 22 takes place. Before such tests take place, the wafer 22 can be rotated so that the index mark(s) found in step 68 is positioned in a preferred orientation for the tests and processing. The resistivity (mentioned above), film thickness, or other properties can be tested in this step. This testing and processing can be performed directly after the mapping and finding of the index marks without having to move wafer 22 to a different testing chuck or station. The coordinates of the wafer as mapped can thus be directly transformed to the coordinates of the chuck using a coordinate transformation operator. The coordinates of the chuck can then be referenced by the testing and processing apparatus. Once the testing and/or processing is complete, the wafer is removed from the chuck in step 72. The process is then complete as indicated at 74.

In alternate embodiments step 70 can be performed before steps 66 and 68. In addition, testing/processing step 71 can be performed before or after step 70 in different embodiments.

Figure 3:
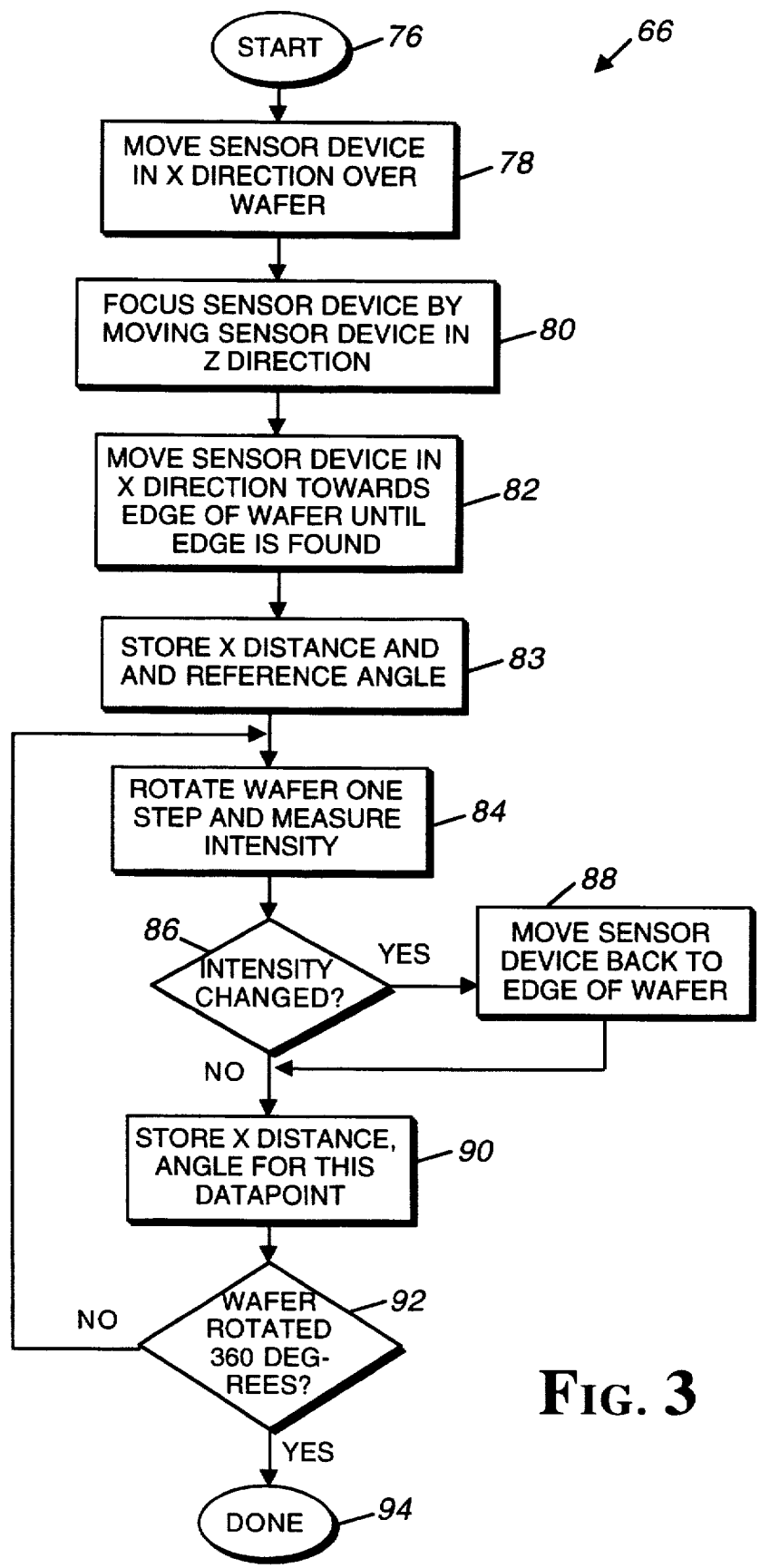
FIG. 3 is a flow diagram illustrating the method of mapping the edge of a wafer according to the present invention.

FIG. 3 is a flow diagram illustrating step 66 of FIG. 2, which is a method of mapping the edge of a wafer according to the present invention. The process begins at 76, and, in a step 78, sensor device 24 is moved over wafer 22. This is accomplished by computer 46 controlling x-direction motor 36 to move vertical member 28 in an x-direction, which also moves sensor device 24 in an x-direction. The actual point on wafer 22 over which sensor device 24 is positioned is not critical as long as the point is on the wafer 22 at least a small distance (e.g., more than about 2 mm) away from the edge of the wafer.

In step 80, the computer focusses the sensor device by moving the sensor device 24 in a z-direction. The computer 46 moves sensor device 24 by controlling z-direction motor 32 to move vertical member 28 in the z-direction, which causes sensor device 24 to also move in the z-direction. The computer positions the sensor device at the focal distance above the wafer. This process is described in greater detail with reference to FIG. 4. In next step 82, the computer 46 moves the sensor device in an x-direction towards the edge of the wafer until the edge is detected. The computer 46 moves sensor device 24 by controlling x-direction motor 36 to move vertical member 28 in the x-direction, which causes sensor device 24 to also move in the x-direction. The computer stops the movement of the sensor device at the wafer edge. The edge of the wafer can be detected by sensing the intensity level of the reflected beam Br. The process of finding the edge of the wafer is described in greater detail with respect to FIG. 5.

In step 83, computer 46 stores a reference datapoint as the current x-distance and angle of the sensor device. The x-distance is the distance from the center of rotation of the wafer to the sensor device (in the plane of the wafer), which is currently positioned at the edge of the wafer, and is known from step 82. The angle of the sensor device is the angle θ between the current point at the edge of the wafer and a certain reference point on the wafer. The angle stored in step 83 can be used as the reference point angle.

In step 84, the computer 46 rotates the wafer one step about axis A of chuck 16 (on the θ axis) and the intensity of beam Br is measured at the new position of the sensor device over the wafer. In the described embodiment, the computer can control chuck motor 20 to rotate the chuck and the wafer in predetermined step distances. For example, a step can be defined as 1/8000 of a full circle, i.e., a circle can be defined by 8000 steps. Thus, 8000 different points can be measured along the edge of the wafer to obtain a highly accurate representation of the edge.

In step 86, the computer checks if the intensity measured in step 84 at the current position has changed from the intensity measured at the previous position on the edge of the wafer. The change in intensity indicates that the sensor device is no longer detecting a beam reflected from the edge of the wafer, i.e., the edge of the wafer has moved closer to or further from center $C_R$ as the wafer has been rotated. This edge movement is typically caused by one or both of two possibilities: the wafer's center of rotation $C_R$ is offset from the center of the wafer $C_W$, so the edge of the wafer will move closer to and further from the center of rotation as the wafer is rotated; or, the sensor device has reached an index mark in the edge of the wafer, such as a flat or a notch.

If a change in intensity has not occurred between the current position and the previous position, then the process continues to step 90 (detailed below). If a change in intensity has occurred, then the process continues to step 88, in which computer 46 moves the sensor device back to the edge of the wafer. This process is described in greater detail with respect to FIG. 6. The process then continues to step 90.

In step 90, the computer 46 stores the x-distance and angle of the current position of the sensor device for the current datapoint. A datapoint thus includes the x-distance (radius) and angle for a point on the edge of the wafer. As described above, the x-distance is the distance from the center of rotation of the wafer to the sensor device, which is at the edge of the wafer, and is a known quantity. The angle is known by counting how many rotation steps have been taken since the reference point and knowing the size of a rotation step. For example, if there are 8000 rotation steps for a full rotation (360 degrees), each step is $360/8000=0.045$ degrees of rotation. If the current point is the 80th point measured, then the angle is 80(0.045) or 3.6 degrees. In step 92, the computer 46 checks if the wafer has been rotated 360 degrees, i.e., the entire edge has been mapped. If not, then the process returns to step 84 to rotate the wafer another step and take another datapoint. If the wafer has been fully rotated, then the process is complete as indicated at 94.

The accuracy of the edge mapping process as described above depends on, among other factors, the resolution of the x-axis movement of sensor device 24 and the θ-axis movement of chuck 16. It has been found that, using an apparatus which can move sensor device 24 in increments or steps of 13–14 μm, the edge of the wafer is determined within an accuracy of +/−15–20 μm.

Figure 4:
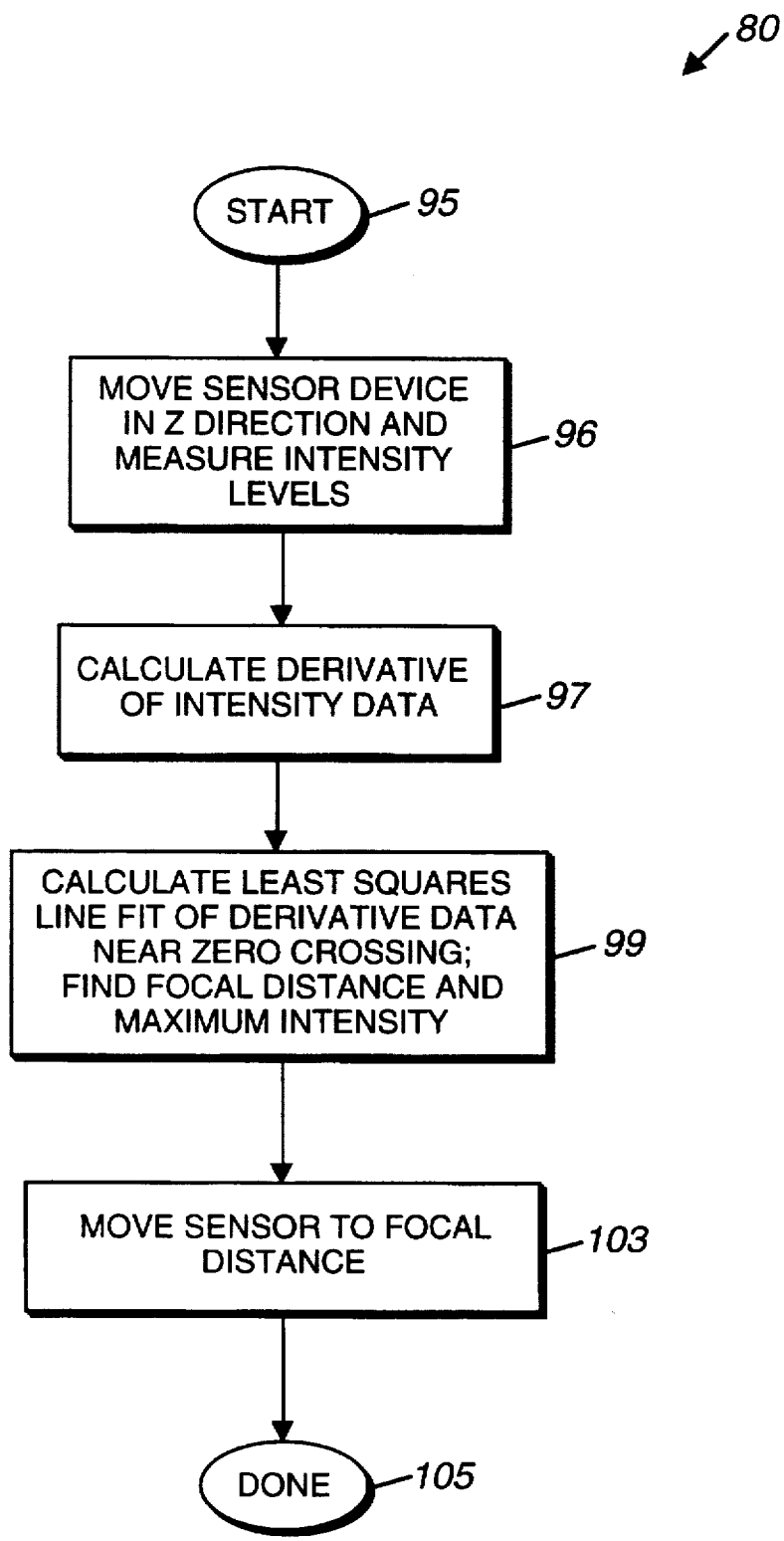
FIG. 4 is a flow diagram illustrating the method of focussing the sensor device by moving the sensor device in a z-direction.
Figure 4A:
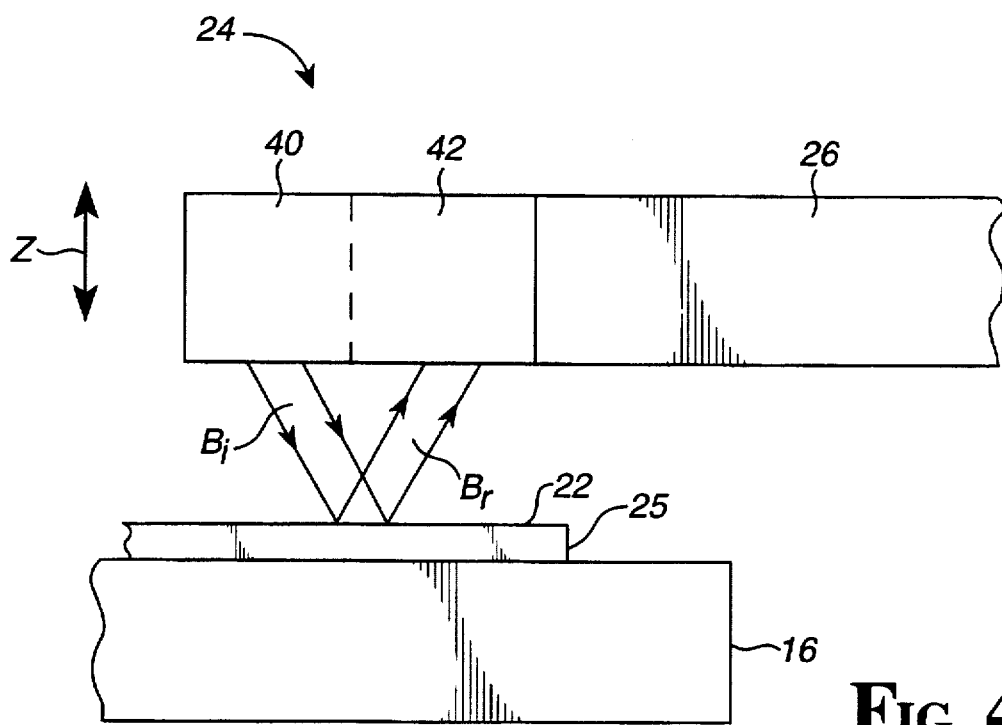
FIG. 4a is a side elevational view of a portion of a wafer, chuck, and sensor device of the present invention in a process of determining the focal distance for the sensor device.

FIG. 4 is a flow diagram illustrating step 80 of FIG. 3, in which the sensor device is moved in a z-direction to focus the sensor device. The process begins at 95. In step 96, sensor device 24 is moved in the z-direction and intensity levels of reflected beam Br are measured and stored by computer 46 at several points on the z-axis 50. This movement is shown in FIG. 4a. FIG. 4a shows a side elevational view of a portion of wafer chuck 16, wafer 22, and sensor device 24. Sensor device 24 has been positioned over wafer 22 as described in step 78 of FIG. 3. The beam of energy Bi emitted from emitter 40 is incident on the surface of wafer 22 and reflects from the surface as beam Br. Detector 42 receives beam Br and senses the intensity of the beam. Computer 46 moves sensor device 24 along the z-axis 50 using z-direction motor 32 until an adequate range of intensities have been sensed. The sensor device can be moved either away from the wafer surface or toward the wafer surface, as long as an adequate range of intensities are measured and stored. In the described embodiment, the adequate range of intensities is determined by examining the measured intensity levels, explained with reference to FIG. 4b.

Figure 4B:
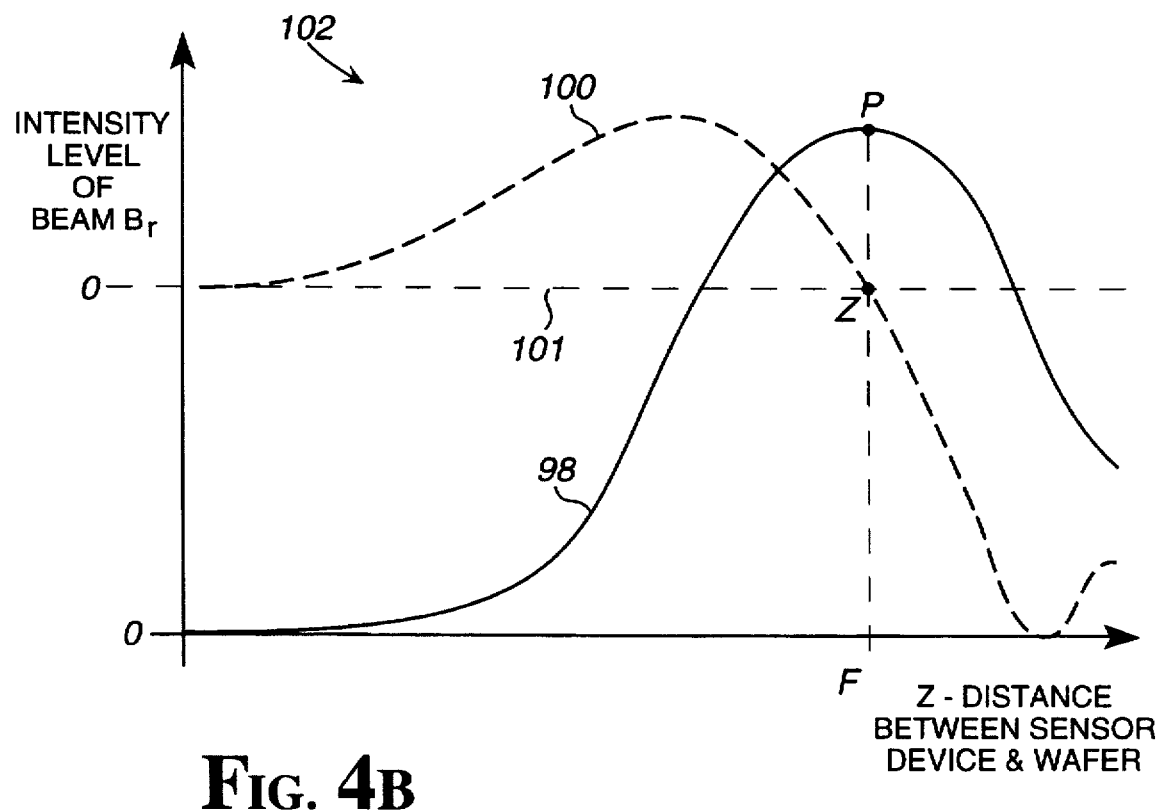
FIG. 4b is a graph of the distance moved by the sensor device in the z direction versus the intensity of a reflected beam of electromagnetic energy.

FIG. 4b is a graph 102 showing the relationship between the intensity of the reflected beam Br and the distance of sensor device 24 from the surface of wafer 22 (the "z-distance"). The horizontal axis represents the z-distance of the sensor device, and the vertical axis represents the intensity of the reflected beam Br. Curve 98 represents the intensity of the reflected beam at various z-distances, and is shown as a bell-shaped curve; several points on curve 98 have been stored in step 96 in, for example, memory of computer 46. As indicated by curve 98, the intensity of the reflected beam Br increases as the sensor device 24 is moved a greater distance away from the surface of the wafer (increasing z-distance). At distance F, the focal distance, the intensity of the reflected beam is at its maximum. If the distance between the sensor device and the wafer is increased beyond distance F, then the intensity of the reflected beam begins to decrease.

The computer can determine if an adequate range of intensities has been measured by examining the already-stored intensities. An adequate range of intensities should include the focal point F in that range. If the stored data indicates that intensities increase and then decrease, the focal point is included and step 96 is complete. If intensities increase but do not decrease, then the computer continues moving sensor device 24 in a z-direction until the intensities decrease (i.e., the focal point has been sensed).

In step 97, the first derivative is calculated from the intensity data measured in step 96 to accurately determine the focal point. As shown in FIG. 4b, a derivative curve 100 starts at zero, moves into the positive intensity region, crosses the zero line 101, and moves into the negative intensity region. Zero line 101 for derivative curve 100 has been adjusted upward in graph 102 to show the zero crossing more clearly. The point Z where derivative curve 100 crosses the zero line 101 has a z-distance corresponding to the focal distance, i.e., the z-distance at which maximum intensity was sensed by sensor device 24.

In step 99, a least squares line fit of the derivative data near the zero crossing point Z is calculated by computer 46 to find the maximum intensity and focus distance F. In the described embodiment, 10 derivative points on either side of the derivative value closest to zero line 101 are included in the fit line calculation. Calculation of a least squares line fit between data points, or similar data fits, are well known to those skilled in the art. Once the derivative fit line L has been calculated, the crossing of the fit line L with zero line 101 is found and the z-distance associated with this point is stored as the focal distance F. The maximum intensity is found by looking at the point P on curve 98 having the focal distance F and finding the associated intensity level.

In step 103, the sensor is moved to the focal distance F found in step 99. At this z-distance, sensor device 24 detects the maximum intensity beam Br and can measure characteristics of wafer 22 with more accuracy. The process is then complete as indicated in step 105.

It may be desired to move the sensor device to a z-distance which provides a predetermined intensity level that is known to provide a good degree of sensitivity for detector 42, i.e. at a known offset from the focal distance. For example, an intensity close to (slightly less than) the maximum intensity of beam Br found above can be used. At this intensity level, for example, the diameter of the beam spot on the detector may be greater and thus easier to detect, and the detector 42 will thus be more sensitive to variations in intensity caused by moving the sensor over the edge of the wafer in the edge mapping process of FIG. 3.

For the purposes of mapping the edge of wafer 22 in the process of FIG. 3, the maximum intensity of reflected beam Br does not need to be known precisely. Thus, only an approximate knowledge of the focal distance F for sensor device 24 might be needed. In such a case, the intensity levels measured by sensor device 24 can be examined and the highest intensity that was measured can be chosen without calculating a derivative.

Figure 5:
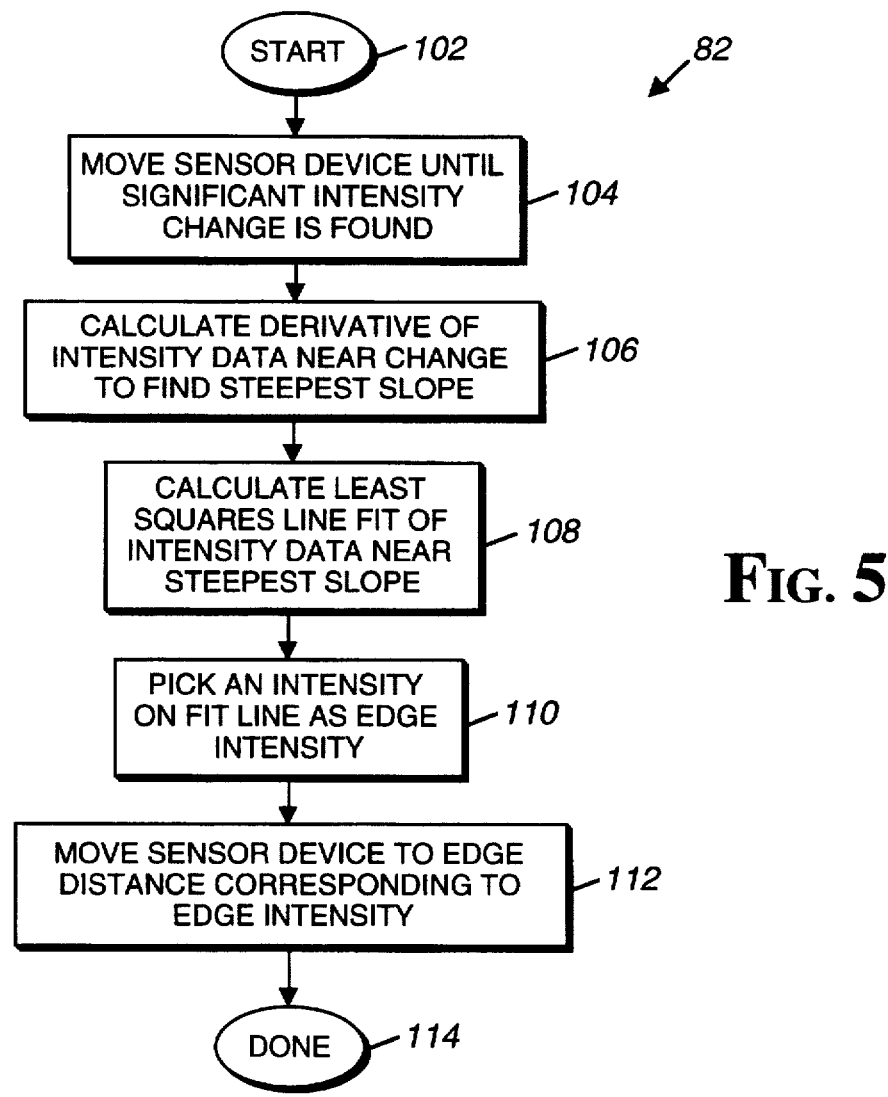
FIG. 5 is a flow diagram illustrating the process of finding the edge of the wafer by moving the sensor device in an x-direction.
Figure 5A:
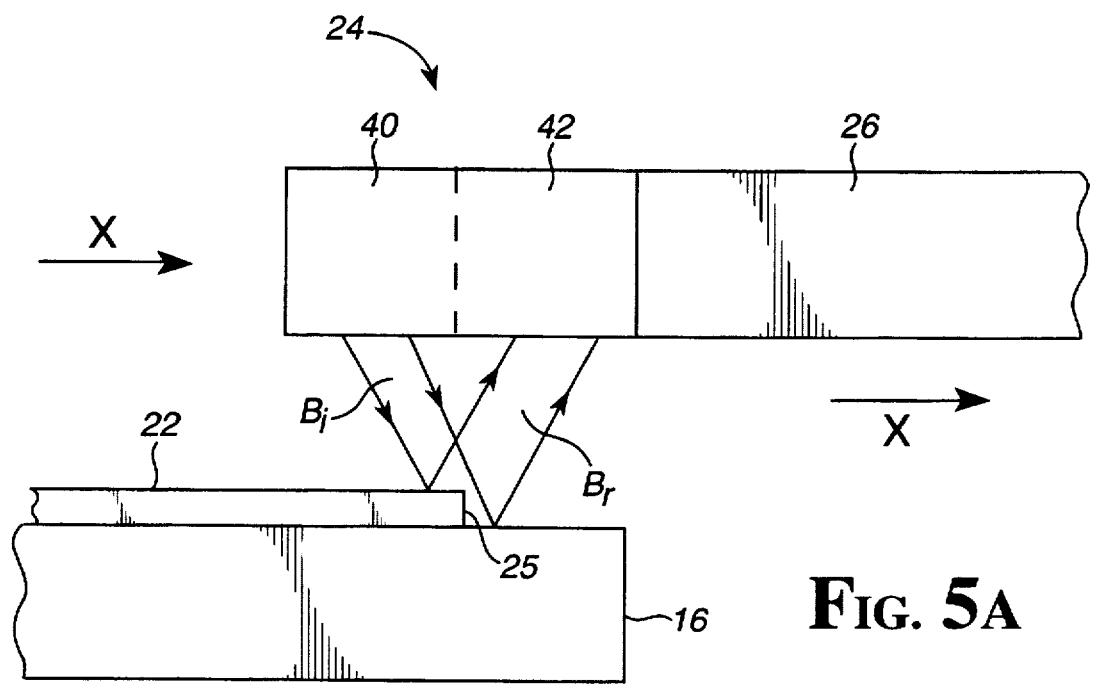
FIG. 5a is a side elevational view of a portion of a wafer, chuck, and sensor device of the present invention in a process of finding the edge of the wafer.

FIG. 5 is a flow diagram illustrating step 82 of FIG. 3, in which the computer moves sensor device 24 in an x-direction towards the edge of wafer 22 until the edge of the wafer is found. The process begins at 102. In step 104, the sensor device is moved until a significant change in the intensity of reflected beam Br is detected. As shown in FIG. 5a, once sensor device 24 moves beyond the edge 25 of wafer 22, the beam Bi becomes partially and then wholly incident on the surface of chuck 16 instead of the surface of wafer 22. In the described embodiment, the surface of chuck 16 is not as reflective as the surface of wafer 22, so the reflected beam Br is greatly reduced in intensity compared to the intensity of beam Br when reflected from wafer 22. A significant change (drop) in intensity in the described embodiment is a 99% drop in intensity. Once the intensity change has been detected, computer 46 continues to move sensor device 24 a small distance in the same x-direction to get a complete set of intensity values.

Figure 5B:
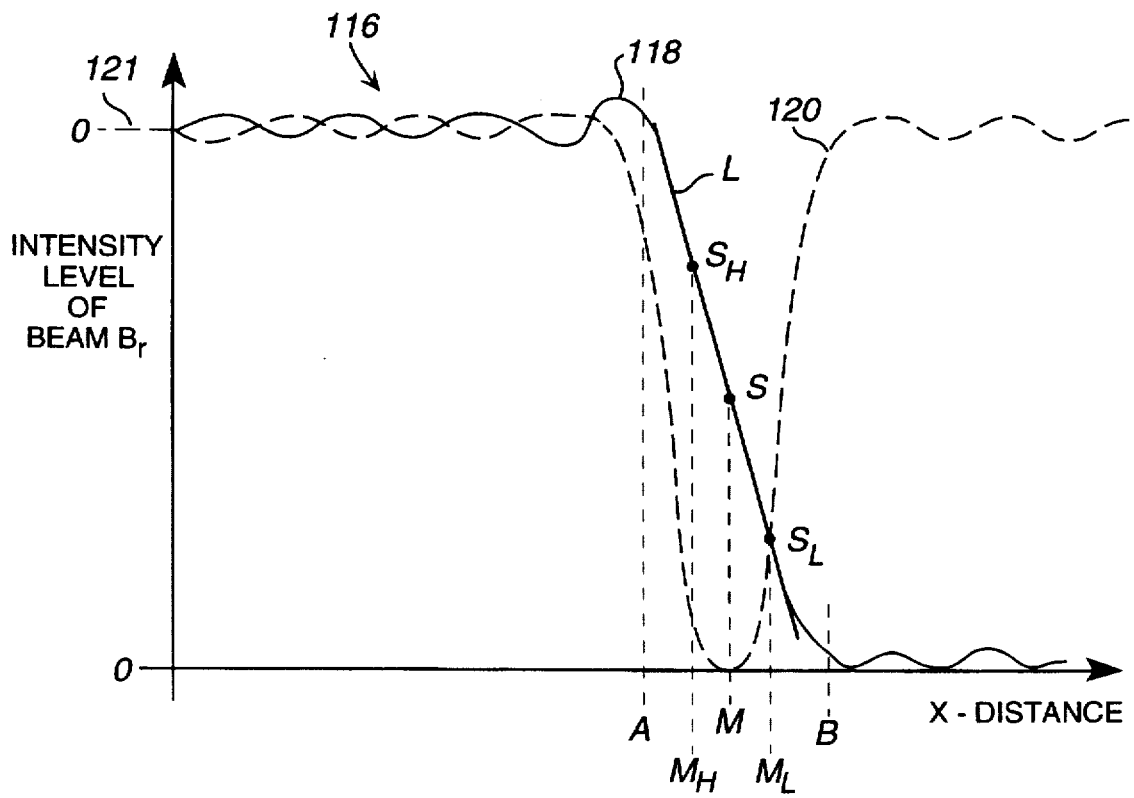
FIG. 5b is a graph of the distance moved by the sensor device in the x direction versus the intensity of the reflected beam of electromagnetic energy.

Referring back to FIG. 5, in next step 106, the computer 46 calculates a first derivative of the intensity data near the change to find the steepest slope. FIG. 5b is a graph 116 showing the relationship between the intensity of the reflected beam Br and the distance of sensor device 24 from the center of rotation of wafer 22 (the x-distance). The horizontal axis represents the x-distance of the sensor device, and the vertical axis represents the intensity of the reflected beam Br. Curve 118 represents the intensity of the reflected beam at various x-distances. As indicated by curve 118, the intensity of the reflected beam Br is relatively high on the left side of the graph, where beam Br is being reflected from the surface of the wafer before the edge of the wafer has been reached. Near x-distance A, however, the intensity begins to drop sharply and continues to drop until, beginning at about x-distance B, the intensity of beam Br stays very low. Between x-distances A and B, incident beam Br is being reflected partially by the wafer 22 and partially by the surface of chuck 16. After point B, beam Br is being reflected entirely from chuck 16.

Curve 120 is represents the derivative of the intensity data curve 118. The zero line 121 for derivative curve 120 has been adjusted upward in graph 116 to show the curve more clearly. As seen in graph 116, the curve 120 is at its lowest intensity at the x-distance M. A minimum point of a derivative of a curve indicates that the curve is changing most rapidly at that minimum point, i.e., the steepest slope of a curve is at the minimum point of the curve's derivative. Thus, the point of steepest slope of curve 118 is at point S, where the x-distance is M.

Referring back to FIG. 5, in next step 108, the computer calculates the least squares line fit of the intensity data near the steepest slope of the intensity curve. In the described embodiment, computer 46 takes the points of curve 118 around point S which are within +/−10 points of point S. A least squares line fit is then calculated for these points, indicated by line L in FIG. 4b. The process of calculating a least squares line fit for given data points is well known to those skilled in the art.

In next step 110, the computer picks an intensity on the calculated line fit. This intensity can be the intensity at point S, or any arbitrary intensity on the fit line L. It is desirable to choose an intensity that is some distance from the endpoints of the fit line L, since the fit line can be used to determine how far the beam has deviated from the edge of the wafer. The chosen point ("edge point") has a corresponding edge intensity and a corresponding edge distance on the x-axis.

In step 112, the computer moves the sensor device to the edge distance corresponding to the chosen edge point. This edge distance is now considered to be the edge of the wafer, and is the reference point for future measurements as described with reference to FIG. 3. The process is then complete as indicated at 114.

Figure 6:
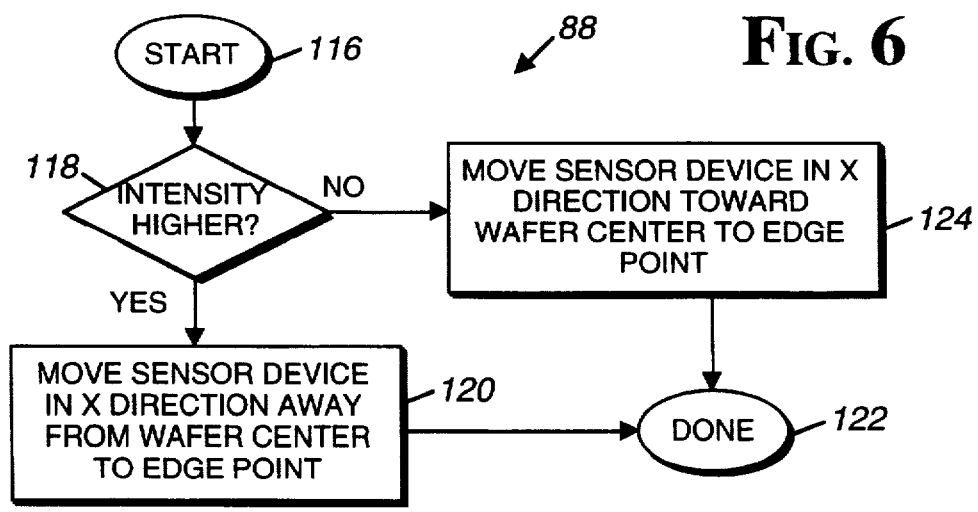
FIG. 6 is a flow diagram illustrating the process of moving the sensor device back to the edge of the wafer to compensate for the edge having moved after a rotation step.

FIG. 6 is a flow diagram illustrating step 88 of FIG. 3, in which the sensor device 24 is moved back to the edge of the wafer to compensate for the edge having moved after a rotation step. The process begins at 116. In step 118, the computer 46 checks if the intensity of the reflected beam Br is higher than the intensity measured for the previous point on the wafer edge. If so, then process continues to step 120. When the intensity is higher, the current x-distance of the sensor device must be less than the edge distance, i.e., the edge of the wafer has increased its x-distance. For example, in FIG. 5b, if point S is used as the edge point, and if the previous datapoint was at point S, then a point having a higher intensity would be, for example, point $S_H$. The x-distance corresponding to point $S_H$ is distance $M_H$, which is closer to the wafer center than the x-distance M of point S. Thus it is known that the sensor device must be moved an increased x-distance, away from the wafer center, for it to be again positioned at the edge point.

The computer 46 moves the sensor device in an x-direction away from the wafer center back to the edge point of the wafer. The computer can easily accomplish this by examining the fit line L of intensity points calculated in step 108 of FIG. 5. Since the current x-distance $M_H$ of the sensor device is known, and the x-distance M of the edge point S is known, the distance between the current point and the edge point is known. The computer can simply move the sensor device 24 the required distance back to the edge point. This moved distance can be added to the x-distance of the previous point to find the x-distance of the current datapoint.

In a different embodiment, the computer may not have to move the sensor device for every rotation step of chuck 16, since the distance between the current x-distance and the x-distance of the previous point is known from the fit line L. The computer could just use the fit line to map the edge of the wafer as the wafer is rotated. The distance between the current point and the previous measured point can be added to the x-distance of the previous point to find the current x-distance. The wafer can then be rotated and the next intensity measured, found on the fit line, and the distance calculated between the current point and the previous point. However, if the edge of the wafer varies its x-distance considerably as the wafer is rotated (for example, if the wafer is very much off-center or there is a large index mark), then the detected intensity of beam Br might be outside the range of fit line L between x-distances A and B, leading to inaccurate results. It is therefore likely that sensor device 24 will have to be moved for at least some mapped datapoints to keep the sensor device within the range of x-distance A to x-distance B.

Alternatively, the sensor device 24 can be moved to edge distance S without using fit line L. The x-distance of the sensor device can be increased until an intensity corresponding to the edge intensity at point S is detected. The computer then adds the distance moved to the x-distance of the previous point to find the x-distance of the current datapoint. Once the sensor has been moved and the change in x-distance between the current point and the previous point has been found, the process is complete as indicated at 122.

If in step 118 the intensity at the current position of the sensor device is lower than the intensity measured for the previous datapoint, then the process continues to step 124.

When the intensity is lower, the current x-distance of the sensor device must be greater than the edge distance, i.e., the edge of the wafer has decreased its x-distance. This can occur, for example, when an index mark such as a notch is first detected. For example, in FIG. 5b, if point S is used as the edge point, then a point having a lower intensity would be, for example, point $S_L$. The x-distance corresponding to point $S_L$ is distance $M_L$, which is further from the wafer center than the x-distance M of point S. Thus it is known that the sensor device must be moved to a lower x-distance, towards the wafer center, for it to be again positioned at the edge point.

The computer 46 moves the sensor device in an x-direction towards the wafer center, back to the edge point of the wafer. The computer can easily accomplish this, as described above, by examining the fit line L of intensity points calculated in step 108 of FIG. 5. The distance moved by sensor device 24 can be subtracted from the x-distance of the previous point to find the x-distance of the current datapoint.

As described above, in a different embodiment, the computer may not have to move the sensor device for each rotation step, since the distance between the current x-distance and the x-distance of the previous point is known from the fit line L. Using the fit line, the distance between the current point and the previous measured point can be subtracted from the x-distance of the previous point to find the current x-distance. Again, sensor device 24 will typically have to be moved for at least some mapped datapoints to keep the sensor device within the range of x-distance A to x-distance B.

Alternatively, the sensor device 24 can be moved to edge distance S without using fit line L. The x-distance of the sensor device can be decreased until an intensity corresponding to the edge intensity at point S is detected. The computer then subtracts the distance moved from the x-distance of the previous point to find the x-distance of the current datapoint. Once the sensor has been moved and the change in x-distance between the current point and the previous point has been found, the process is complete as indicated at 122.

Figure 7:
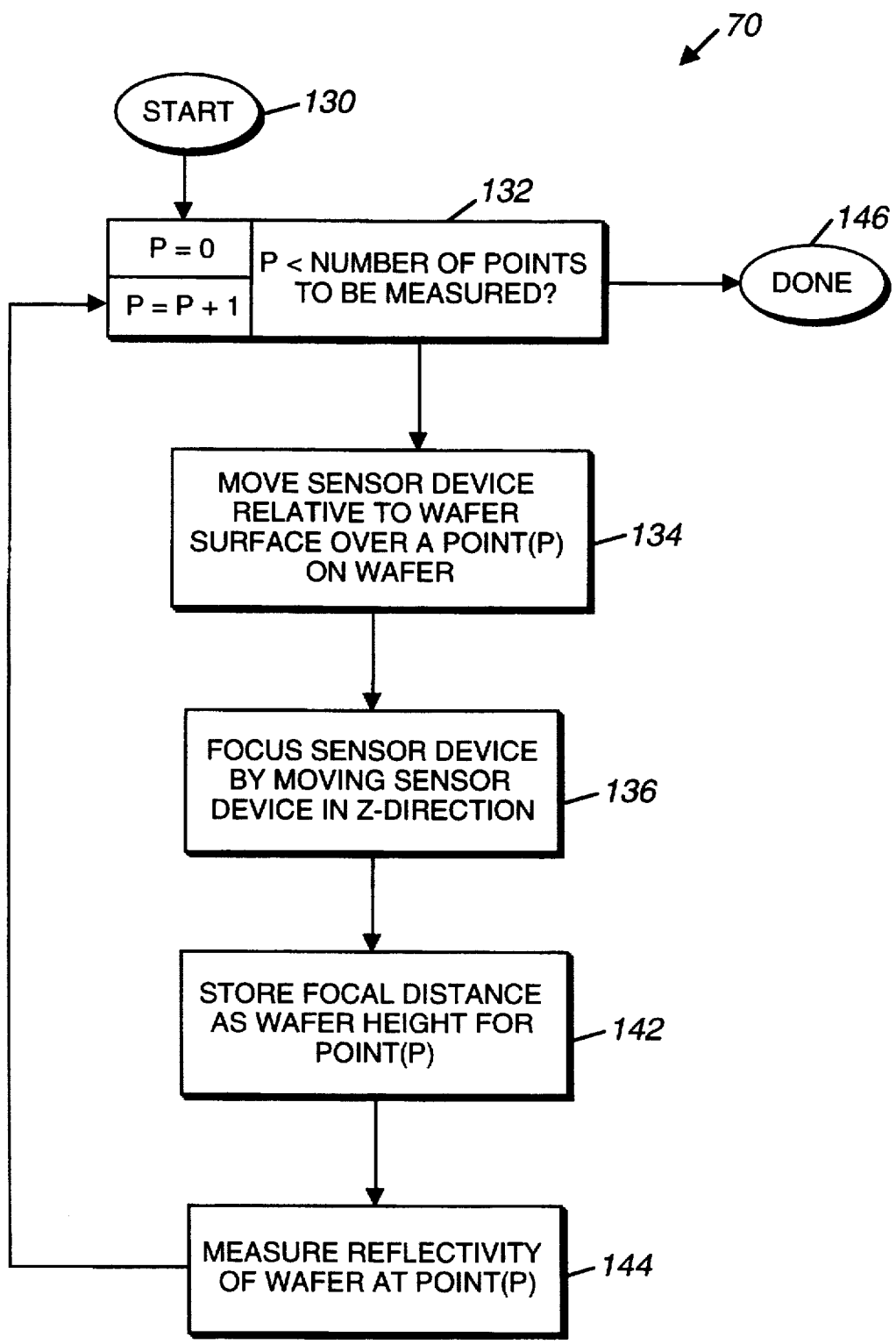
FIG. 7 is a flow diagram illustrating the process of mapping the height and reflectivity of the wafer.

FIG. 7 is a flow diagram illustrating step 70 of FIG. 2, in which the height and reflectivity of the wafer are mapped. This process can be implemented before or after the edge mapping process. The process begins at 130. In step 132, a counter variable P is initialized to O and P is compared to the number of points on the wafer surface which are to be measured. The number of points to be measured depends on the application for which apparatus 10 is to be used. For example, only a general or approximate height of the wafer might be desired, so that only 2 to 10 points on the wafer surface need to be tested for height. Alternatively, an extensive mapping of the wafer surface might be desired, and 1000 points on the wafer surface can be measured.

If P is less than the number of points to be measured, then the process continues to step 134, in which the sensor device is moved relative to the wafer surface to a position over a point(P) on the wafer surface. This movement depends on the number of points and the point locations on the wafer surface which are desired to be measured for height. Sensor device 24 can be moved along x-axis 54 to a position over a new point(P). In alternate embodiments, chuck 16 can be moved an x-distance to achieve the same result. In addition, chuck 16 can be rotated so that the sensor device is over a new point(P). In a typical arrangement, sensor device 24 is moved along x-axis 54 to a certain radius of wafer 22, and several points on the wafer along that radius are measured for height by rotating chuck 16.

In step 136, sensor device 24 is focussed by moving the sensor device along the z-axis 50. This step is similar to step 80 of FIG. 3, and is described in greater detail in the process of FIG. 4. In the focussing process, the computer moves sensor device 24 to the focal distance, which is the z-distance above wafer 22 which provides the maximum intensity of beam Br. This focal distance is stored as the wafer "height" for point(P) in step 142, although it is not the actual height of the wafer but the z-distance of the sensor device above the wafer surface. This focal distance is compared to other focal distances found at other points on the wafer surface. By calculating the difference between focal distances measured at several points on the wafer surface, the wafer's height can be mapped. For example, if a difference between the focal distances of point(P) and point(P-i) is found, then the height of the wafer is known to vary at those points, i.e., the surface is warped. The amount of the warp is known from the difference of the focal distances.

The accuracy of the determined focal distance is typically limited to the accuracy of the sensor device 24 and its movement resolution. Since sensor device 24 is moved in steps, there is a certain resolution to the determined focal distance of the sensor device above the wafer surface. However, using a least square fit line for measured intensities, as described with respect to FIGS. 4 and 4b, greatly increases the accuracy. It has been found that, using a sensor device which can be moved in z-axis increments of 13 μm meters, the focal point can be determined within about 10 μm. The warp of the wafer can thus be specified to that degree of accuracy.

After step 142, step 144 is preferably implemented, in which the reflectivity at point(P) on the wafer surface is measured. Before implementing process 70, the maximum intensity of a beam reflected from a test (calibration) surface can be determined. The reflectivity of the test surface is also known. In step 144, the maximum intensity of the reflected beam from point(P), found at the focal distance, is compared to the maximum intensity known from the test surface. Assuming the reflectivity varies linearly with the maximum intensity, the reflectivity Rp of the wafer at point(P) is calculated by the following formula:

$$\frac{I_T}{I_P} = \frac{R_T}{R_P} => R_P = R_T \frac{I_P}{I_T}$$

where $I_T$ is the intensity of the reflected beam from the calibration surface, $I_P$ is the intensity of the reflected beam from the current point(P), $R_T$ is the reflectivity of the calibration surface, and $R_P$ is the reflectivity at the current point(P). Using the above procedure, a distribution of reflectivities can be obtained at the points that are also measured for height.

After step 144, the process returns to step 132 to increment P and compare P to the number of points to be measured for height. If P is still less than the number of points to be measured, the process measures height and reflectivity for another point(P). Once P has been incremented to be greater than or equal to the number of points, the process is complete as indicated at 146.

Figure 8:
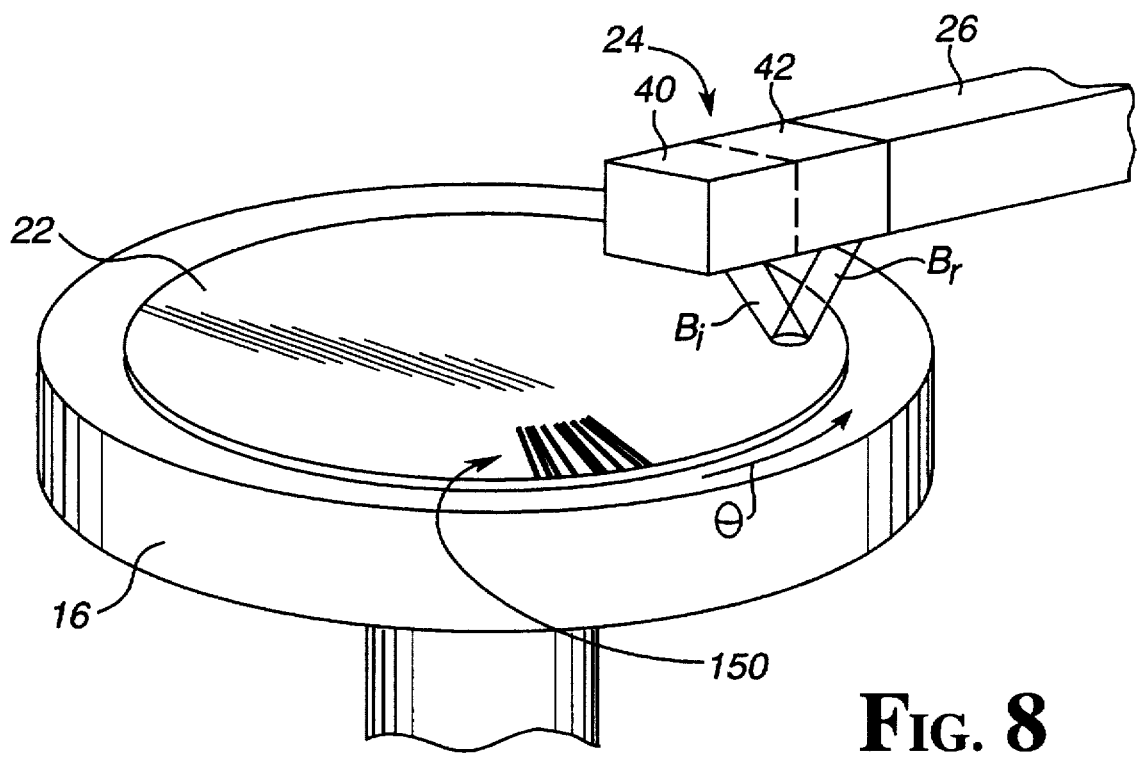
FIG. 8 is a perspective view of the sensor device sensing a wafer including an identification mark by rotating the wafer.
Figure 8A:
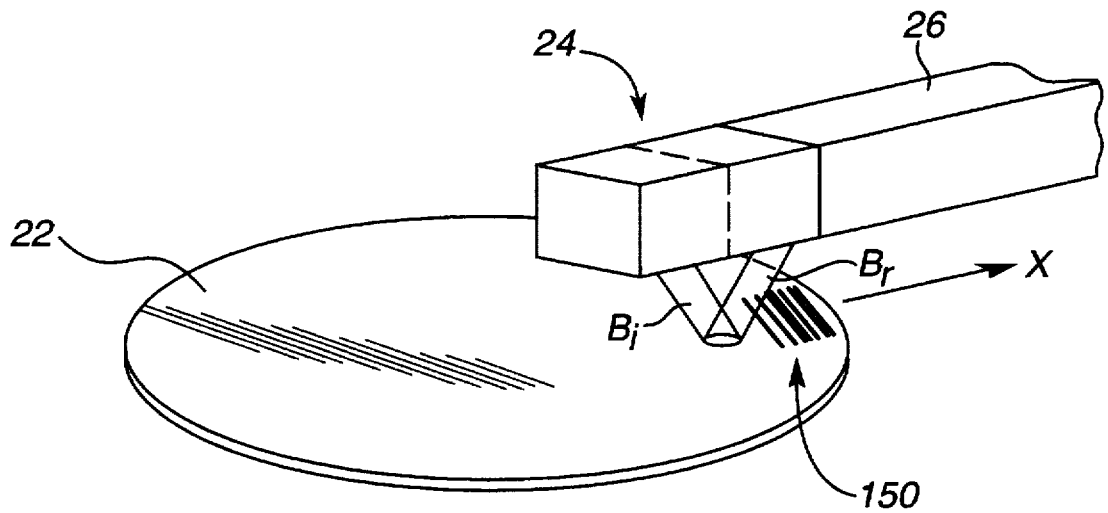
FIG. 8a is a perspective view of the sensor device sensing a wafer including an identification mark by moving the sensor device.

FIG. 8 is a perspective view of wafer 22 on chuck 16, where wafer 22 includes an identification mark 150. Some wafers can be identified or marked using specific codes which can be read. Sensor device 24, which emits an electromagnetic beam Bi and detects a reflected beam Br, can optically read identifying marks on a wafer. For example, a bar code mark 150 can be printed on the edge of wafer 22. Before, after, or during the processes of mapping edge, height and reflectivity of wafer 22, sensor device 24 can be moved to a radius at which the bar code mark 150 is known to be positioned. The wafer 22 can then be rotated so that bar code mark 150 moves underneath beam Bi and the computer 46 can interpret the resulting Br intensities to identify the mark and the wafer. Reading a mark such as a bar code mark 150 is well known to those skilled in the art. Sensor device 24 (or wafer 22) can also be linearly translated in the x-y plane, e.g. along the x-axis, to move bar code mark 150 under beam Bi, as shown in FIG. 8a. Alternatively, both chuck 16 can be rotated and sensor device 24 translated in the x-y plane at the same time to read bar code marks 150 positioned at a variety of angles on the surface of wafer 22.

While this invention has been described in terms of several preferred embodiments, it is contemplated that alterations, modifications and permutations thereof will become apparent to those skilled in the art upon a reading of the specification and study of the drawings. It is intended that the claims include all such alterations, modifications and permutations as fall within the spirit and scope of the present invention.

What is claimed is:

1. A method for mapping the edge of a wafer, the method comprising:
   (a) positioning a wafer on a platform, said wafer having a surface and an edge;
   (b) providing a sensor device over said surface of said wafer such that a beam of electromagnetic energy emitted by said sensor device is reflected from said surface of said wafer, wherein an intensity of said reflected beam is measured;
   (c) providing relative movement between said sensor device and said wafer such that said sensor device is positioned at said edge of said wafer, wherein said intensity of said reflected beam is measured during said relative movement and is utilized to position said sensor device at said edge; and
   (d) providing relative rotational movement between said wafer and said sensor device and measuring said intensity of said reflected beam at a plurality of locations on the edge of said wafer as datapoints, said datapoints being utilized in mapping said edge of said wafer.

2. A method as recited in claim 1 wherein said intensity of said reflected beam is measured by said sensor device.

3. A method as recited in claim 2 wherein said rotatable platform is a chuck that has a larger diameter than a diameter of said wafer.

4. A method as recited in claim 2 wherein step (c) includes providing relative linear movement between said sensor device and said wafer until said intensity of said reflected beam is changed, where said changed intensity indicates that said beam emitted by said sensor device is being reflected at said edge of said wafer.

5. A method ms recited in claim 2 wherein step (c) includes the steps of:
   focussing said sensor device by providing relative movement between said sensor device and said wafer in a z-direction perpendicular to said surface of said wafer and positioning said sensor device at a distance where said reflected beam detected by said sensor device is near a maximum intensity;
   providing relative movement between said sensor device and said wafer in an x-y plane parallel to said surface of said wafer until said intensity of said detected beam is significantly reduced, where said reduced intensity indicates that said emitted beam is being reflected at said edge of said wafer.

6. A method as recited in claim 5 wherein step (d) includes providing relative movement between said sensor device and said wafer in said x-y plane to maintain said sensor device at said edge of said wafer as said wafer is rotated.

7. A method as recited in claim 6 wherein said step of providing relative movement between said sensor device and said wafer in said x-y plane to maintain said sensor device at said edge includes checking if said intensity of said reflected beam has changed after a portion of said relative rotational movement has occurred.

8. A method as recited in claim 7 further comprising a step of storing a plurality of intensity levels of said reflected beam as said relative x-y plane movement occurs, and wherein a derivative of said intensity levels is calculated to accurately determine said position of said edge of said wafer.

9. A method as recited in claim 8 wherein said step of calculating said derivative includes calculating a least square line fit between calculated points of said derivative.

10. A method as recited in claim 5 wherein said relative movement in said x-y plane between said sensor device and said wafer includes moving said sensor device along an x-axis.

11. A method as recited in claim 5 wherein said relative rotational movement includes rotating said platform.

12. A method as recited in claim 5 further comprising a step of mapping a height of said wafer by measuring said maximum intensity of said reflected beam at a plurality of points on said surface of said wafer.

13. A method as recited in claim 12 further comprising a step of measuring the reflectivity of said surface of said wafer using said measured maximum intensity of said reflected beam.

14. A method as recited in claim 13 further comprising a step of reading encoded information marked on said surface of said wafer.

15. A method for mapping the height of a wafer, the method comprising:
   (a) positioning a wafer on a rotatable platform, said wafer having a surface positioned in an x-y plane;
   (b) providing a sensor device over said surface of said wafer such that a beam of electromagnetic energy emitted by said sensor device is reflected from said surface of said wafer, wherein an intensity of said reflected beam is measured by said sensor device;
   (c) focussing said sensor device by providing relative movement between said sensor device and said wafer in a z direction perpendicular to said surface of said wafer and positioning said sensor device at a first focal distance where said reflected beam has near a maximum intensity, wherein said providing relative movement includes moving said sensor device in said z-direction; and
   (d) Repeating step (c) for a different location on said surface of said wafer to obtain a second focal distance, where said first focal distance and said second focal distance are utilized in mapping said height of said wafer:
   (e) measuring the reflectivity of said surface of said wafer using said measured maximum intensity of said reflected beam; and
   (f) mapping said edge of said wafer by moving said sensor device in an x-y plane parallel to said surface of said wafer until said intensity of said detected beam is significantly reduced, where said reduced intensity indicates that said emitted beam is being reflected at said edge of said wafer.

16. A method as recited in claim 15 wherein said step of mapping an edge of said wafer includes the steps of:

rotating said wafer; and providing relative movement between said sensor device and said wafer in said x-y plane to maintain said emitted beam at said edge of said wafer as said wafer is rotated.

17. A method for mapping the height of a wafer, the method comprising:

(a) positioning a wafer on a rotatable platform, said wafer having a surface positioned in an x-y plane:

(b) providing a sensor device over said surface of said wafer such that a beam of electromagnetic energy emitted by said sensor device is reflected from said surface of said wafer, wherein an intensity of said reflected beam is measured by said sensor device;

(c) focussing said sensor device by providing relative movement between said sensor device and said wafer in a z direction perpendicular to said surface of said wafer and positioning said sensor device at a first focal distance where said reflected beam has near a maximum intensity, wherein said providing relative movement includes moving said sensor device in said z-direction; and (d) Repeating step (c) for a different location on said surface of said wafer to obtain a second focal distance, where said first focal distance and said second focal distance are utilized in mapping said height of said wafer;

(e) measuring the reflectivity of said surface of said wafer using said measured maximum intensity of said reflected beam; and (f) reading encoded information marked on said surface of said wafer.

* * * * *